(12) United States Patent
Guo et al.

(10) Patent No.: US 11,994,696 B2
(45) Date of Patent: May 28, 2024

(54) METHOD FOR MANUFACTURING NAKED-EYE 3D DEVICE, AND NAKED-EYE 3D DEVICE

(71) Applicant: BOE Technology Group Co., Ltd., Beijing (CN)

(72) Inventors: Kang Guo, Beijing (CN); Renquan Gu, Beijing (CN); Xin Gu, Beijing (CN); Feng Zhang, Beijing (CN); Meili Wang, Beijing (CN); Guangcai Yuan, Beijing (CN); Xue Dong, Beijing (CN); Mengya Song, Beijing (CN); Duohui Li, Beijing (CN); Qi Yao, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 483 days.

(21) Appl. No.: 17/483,530

(22) Filed: Sep. 23, 2021

(65) Prior Publication Data
US 2022/0155612 A1  May 19, 2022

(30) Foreign Application Priority Data

Nov. 19, 2020  (CN) .......................... 202011299775.5

(51) Int. Cl.
*G02B 30/27* (2020.01)
*H04N 13/305* (2018.01)

(52) U.S. Cl.
CPC ........... *G02B 30/27* (2020.01); *H04N 13/305* (2018.05)

(58) Field of Classification Search
None
See application file for complete search history.

(56) References Cited

U.S. PATENT DOCUMENTS

| 9,648,306 B1* | 5/2017 | Cui ...................... H04N 13/327 |
| 2010/0182686 A1* | 7/2010 | Fukushima ............ G02B 30/27 |
| | | 359/463 |

* cited by examiner

*Primary Examiner* — Thanh Nhan P Nguyen
(74) *Attorney, Agent, or Firm* — IPro, PLLC (57) ABSTRACT

Embodiments of the present application disclose a method for manufacturing a naked-eye 3D device and a naked-eye 3D device. The method includes: forming a display module including a plurality of pixel islands; forming a spacer layer on the display module; and forming a micro-lens array on the spacer layer, wherein the spacer layer is formed to have a thickness such that the plurality of pixel islands are located at a focal plane of the micro-lens array. The method further includes: forming an alignment mark between the spacer layer and the display module, wherein the alignment mark is used for, when forming the micro-lens array, aligning each micro-lens in the micro-lens array with one of the plurality of pixel islands.

20 Claims, 5 Drawing Sheets

METHOD FOR MANUFACTURING NAKED-EYE 3D DEVICE, AND NAKED-EYE 3D DEVICE

CROSS-REFERENCE TO RELATED APPLICATIONS

The present application claims priority to Application No. 202011299775.5, filed in the Chinese Patent Office on Nov. 19, 2020, the entire contents of which are hereby incorporated by reference.

TECHNICAL FIELD

The present application relates to the technical field of 3D display, and more particularly, to a method for manufacturing a naked-eye 3D device and a naked-eye 3D device.

BACKGROUND

The goal of naked-eye 3D or light field display technology has been to pursue natural and comfortable stereoscopic display effect and restore real stereoscopic scene. To achieve this, it is often necessary to set multiple viewpoints to achieve a multi-viewpoint parallax 3D display. However, the manufacturing method for a multi-view naked-eye 3D device in the related art has problems such as poor accuracy and poor repeatability, which affect the display effect of the 3D device.

SUMMARY

An object of the present application is to provide a method for manufacturing a naked-eye 3D device, and a naked-eye 3D device, so as to solve at least one of the problems in the related art.

In order to achieve the above-mentioned object, the present application adopts the following technical solutions.

In a first aspect of the present application, a method for manufacturing a naked-eye 3D device is provided and includes: forming a display module including a plurality of pixel islands; forming a spacer layer on the display module; and forming a micro-lens array on the spacer layer, wherein the spacer layer is formed to have a thickness such that the plurality of pixel islands are located at a focal plane of the micro-lens array. The method further includes: forming an alignment mark between the spacer layer and the display module, wherein the alignment mark is used for, when forming the micro-lens array, aligning each micro-lens in the micro-lens array with one of the plurality of pixel islands.

According to the method provided in the first aspect of the present application, with the alignment mark provided between the spacer layer and the display module, when forming the micro-lens array, the photolithography apparatus can directly form the micro-lens array according to the alignment mark between the spacer layer and the display module without taking the alignment mark in the display module as a reference, thereby reducing a distance between the alignment mark and the plane to form the micro-lens array. In this way, the photolithography apparatus can clearly identify the alignment mark between the spacer layer and the display module and then perform accurate focus exposure, thereby effectively improving the alignment accuracy of the micro-lenses and the pixel islands to achieve high-precision alignment of the micro-lenses and the pixel islands, and then achieving ultra-multi-viewpoint parallax 3D display of the fabricated naked-eye 3D device and improving the stereoscopic effect of the parallax 3D display of the naked-eye 3D device.

In a possible implementation, the forming the spacer layer on the display module, includes: forming a plurality of spacer layers; the method further includes: forming an alignment mark between every two layers of spacer layers of the plurality of spacer layers, wherein the number of layers of spacer layers is related to a focal length of the micro-lens array to be formed.

In this implementation, by forming the alignment marks between the multiple layers of spacer layers, the naked-eye 3D device for different application scenarios can be made according to different focal lengths of different micro-lens arrays, thereby improving the degree of freedom of the manufacturing method and expanding the application range of the naked-eye 3D device manufactured according to this method. Meanwhile, by forming the alignment marks between the multiple layers of spacer layers, the distance between the alignment mark and the plane to form the micro-lens array can be further reduced, so that the lithography apparatus can more clearly identify the alignment mark and perform focus exposure, thereby achieving high-precision alignment of the micro-lenses and the pixel islands.

In a possible implementation, orthographic projections of alignment marks in different layers onto the display module do not coincide each other.

In this embodiment, by setting the alignment marks of which the orthographic projections do not coincide each other, the photolithography apparatus can accurately identify the corresponding alignment mark when forming the micro-lens array, i.e., it is ensured that there is no other alignment mark in an identification area of the photolithography apparatus, so as to prevent an identification error of the photolithography apparatus.

In a possible implementation, the forming the micro-lens array on the spacer layer, includes: forming micro-lenses in contact with each other; or, forming micro-lenses that are not in contact with each other, and forming a black matrix between the micro-lenses.

In a possible implementation, the forming the display module, includes: forming an LCD module, wherein the LCD module includes a lower polarizer, an array substrate, a color filter substrate, and a liquid crystal layer encapsulated between the array substrate and the color filter substrate.

In a possible implementation, the forming the alignment mark between the spacer layer and the display module, includes: forming a metal layer on the color filter substrate; and patterning the metal layer to form the alignment mark.

In a possible implementation, the method further includes: forming a planarization layer covering the micro-lens array, wherein the planarization layer has a refractive index smaller than a refractive index of the micro-lens; and forming an upper polarizer on the planarization layer; and forming an upper polarizer on the planarization layer.

In this embodiment, by using the planarization layer with a low refractive index to cover the micro-lens array with a high refractive index, it is possible to flatten the micro-lens array while ensuring that directions of refracted light rays emitted the micro-lens array are unchanged, thereby ensuring that the refracted light rays enter a preset observation region.

In a possible implementation, the forming the display module, includes:

forming an OLED module or a micro-led display module, wherein the OLED module or the micro-led display module includes a TFT circuit layer, a light-emitting layer, and an encapsulation layer.

In a possible implementation, the forming the alignment mark between the spacer layer and the display module, includes: forming a metal layer on the encapsulation layer; and patterning the metal layer to form the alignment mark.

In a possible implementation, the method further includes: forming a planarization layer covering the micro-lens array, wherein the planarization layer has a refractive index smaller than a refractive index of the micro-lens.

In a possible implementation, the forming the micro-lens array on the spacer layer, includes: forming the micro-lens array on the spacer layer by using a photolithography apparatus according to the alignment mark between the spacer layer and the display module.

In this embodiment, by using the planarization layer with a low refractive index to cover the micro-lens array with a high refractive index, it is possible to flatten the micro-lens array while ensuring that directions of refracted light rays emitted the micro-lens array are unchanged, thereby ensuring that the refracted light rays enter a preset observation region.

In a second aspect of the present application, a naked-eye 3D device is provided and includes: a display module including a plurality of pixel islands; a spacer layer on the display module; and a micro-lens array on the spacer layer, wherein the spacer layer has such a thickness that the plurality of pixel islands are located at a focal plane of the micro-lens array. The device further includes: an alignment mark between the spacer layer and the display module, wherein the alignment mark is used for aligning each micro-lens in the micro-lens array with one pixel island when forming the micro-lens array.

In a possible implementation, there is a plurality layers of spacer layers, and the device further includes an alignment mark between every two layers of spacer layers of the plurality of spacer layers, wherein the number of layers of spacer layers is related to a focal length of the micro-lens array.

In a possible implementation, orthographic projections of alignment marks in different layers onto the display module do not coincide with each other.

In a possible implementation, the display module is an LCD module; the display module includes a lower polarizer, an array substrate, a color filter substrate, and a liquid crystal layer encapsulated between the array substrate and the color filter substrate.

In a possible implementation, the device further includes a planarization layer covering the micro-lens array; and the planarization layer has a refractive index smaller than a refractive index of the micro-lens.

In a possible implementation, the device further includes an upper polarizer on the planarization layer.

In a possible implementation, the display module is an OLED module or a micro-led display module; the OLED module or the micro-led display module includes a TFT circuit layer, a light-emitting layer, and an encapsulation layer; and the device further includes a planarization layer covering the micro-lens array, wherein the planarization layer has a refractive index smaller than a refractive index of the micro-lens.

In a possible implementation, the micro-lens array includes: micro-lenses in contact with each other.

In a possible implementation, the micro-lens array includes: micro-lenses that are not in contact with each other, and a black matrix between the micro-lenses.

The beneficial effects of the present application are as follows:

In order to overcome the technical problems existing in the related art, the present application provides a method for manufacturing a naked-eye 3D device and a naked-eye 3D device. According to the method, with the alignment mark provided between the spacer layer and the display module, when forming the micro-lens array, the photolithography apparatus can directly form the micro-lens array according to the alignment mark between the spacer layer and the display module without taking the alignment mark in the display module as a reference, which avoids the problem in the related art that it is difficult for a photolithography apparatus to perform accurately focus exposure due to an excessive distance between the alignment mark of the display module and a plane to form the micro-lens array in the related art, thereby reducing a distance between the alignment mark and the plane to form the micro-lens array. In this way, the photolithography apparatus can clearly identify the alignment mark between the spacer layer and the display module and then perform accurate focus exposure, thereby effectively improving the alignment accuracy of the micro-lenses and the pixel islands to achieve high-precision alignment of the micro-lenses and the pixel islands, and then achieving ultra-multi-viewpoint parallax 3D display of the fabricated naked-eye 3D device and improving the stereoscopic effect of the parallax 3D display of the naked-eye 3D device.

BRIEF DESCRIPTION OF THE DRAWINGS

The embodiments of the present application will be described in detail hereinafter in conjunction with the accompanying drawings.

DETAILED DESCRIPTION

The present disclosure is described in detail below. Examples of embodiments of the present disclosure are shown in the drawings, where the same or similar reference numerals indicate the same or similar components or components having the same or similar functions. Further, if detailed descriptions of known technologies are unnecessary for the illustrated features of the present disclosure, they are omitted. The embodiments described below with reference to the drawings are exemplary, and only used to explain the present disclosure, and cannot be construed as limiting the present disclosure.

It will be understood by those skilled in the art that, unless otherwise defined, all terms (including technical and scientific terms) used herein have the same meaning as commonly understood by one of ordinary skill in the art to which this disclosure belongs. It should also be understood that terms such as those defined in the general dictionary should be understood to have meanings consistent with the meanings in the context of the conventional technologies, and unless specifically defined herein, they would not be explained by idealized or overly formal meanings.

Those skilled in the art will understand that, unless specifically stated, otherwise, the singular forms of "a", "an", "the" and "said" may include plural forms. It should be further understood that the wording "including" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it may be directly connected or coupled to the another element, or an intervening element may also be present. Furthermore, "connected" or "coupled" as used herein may include wireless connection or wireless coupling. The term "and/or" as used herein includes all or any of or all combinations of one or more of associated items as listed.

There are mainly two methods for manufacturing a multi-view naked-eye 3D device in the related art. The first method is a conventional method for manufacturing a naked-eye 3D device at present, i.e., attaching a naked-eye 3D film to a display module. This method has the problem of poor precision in alignment attachment between the naked-eye 3D film and the display module. For example, for a small-sized naked-eye 3D device, the attachment precision is generally poor, generally above 3 μm, while for a large-sized naked-eye 3D device, the attachment precision is worse, resulting in dislocation between pixel islands and micro-lenses of the display module and then reducing the 3D display effect of the 3D device.

Figure 1:
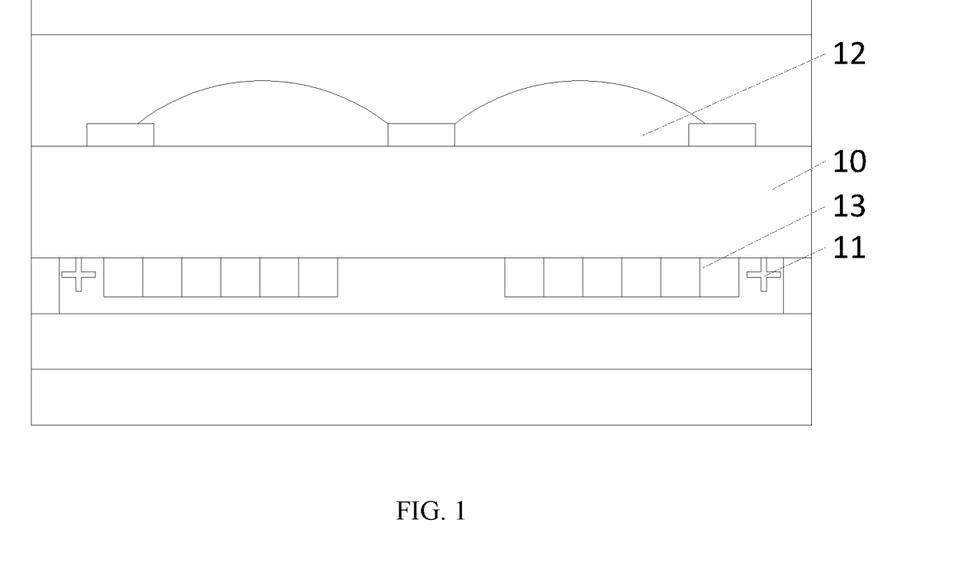
FIG. 1 shows a structural cross-sectional view of a naked-eye 3D device in the related art.

Another manufacturing method is that: as shown in FIG. 1, photolithographic thermal reflow is performed on a display module 10, by taking an alignment mark 11 in the display module 10 as a reference, to perform exposure and molding of a micro-lens array 12 on the display module 10, thereby directly forming the micro-lens array 12. However, since there is a certain distance between a plane where the micro-lens array 12 are located and a plane where the alignment mark 11 in the display module 10 is located, when the distance is large, it is difficult for a photolithography apparatus to perform accurate focus exposure in the process of fabricating the micro-lens array 12, resulting in poor accuracy and poor repeatability of alignment between the micro-lens array 12 and pixel islands 13, and then affecting the display effect of the 3D device.

It is to be noted that, in the conventional design of the naked-eye 3D device, a viewpoint-to-viewpoint spacing W is set, it is understood that the smaller the viewpoint-to-viewpoint spacing W, the larger the number of viewpoints of the naked-eye 3D device. In addition, a distance between a pixel island and a micro-lens in the display module is H (namely, a placement height or a focal length of a micro-lens array). Meanwhile, the viewpoint-to-viewpoint spacing W and the distance H between the pixel island and the micro-lens satisfies the following formula:

$$H=(P\_x \times L)/w;$$

Where L is a viewing distance of users, and P_x is a size of a sub-pixel division unit in the pixel island. As can be seen from the above formula, when the distance H between the pixel island and the micro-lens (i.e., the placement height or the focal length of the micro-lens array) is larger, the number of viewpoints of the naked-eye 3D device is correspondingly larger.

Figure 2:
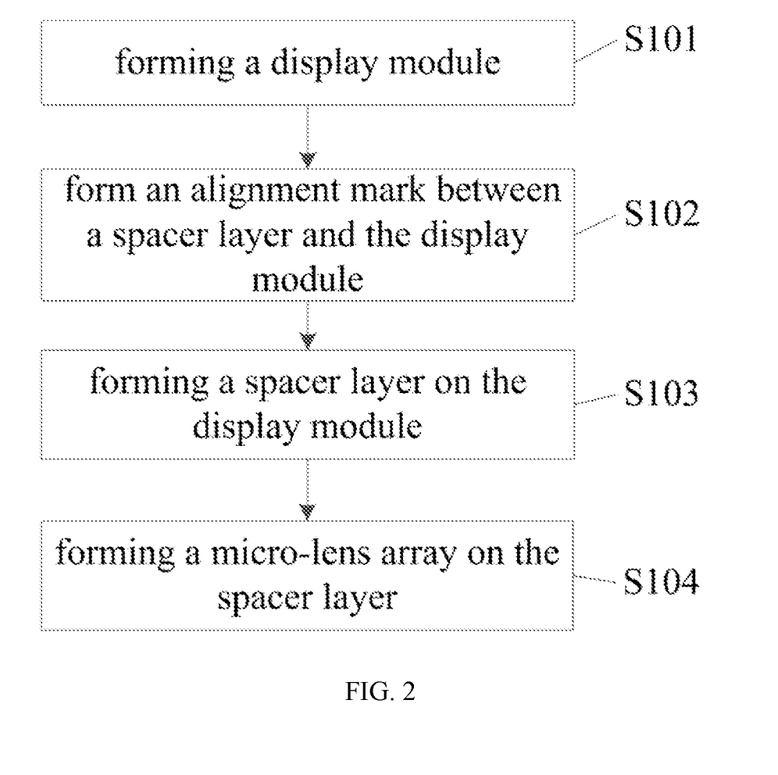
FIG. 2 shows a flowchart of a method for manufacturing a naked-eye 3D device according to an embodiment of the present application.

In view of the technical problems existing in the related art, one embodiment of the present application provides a method for manufacturing a naked-eye 3D device. As shown in FIG. 2, the method includes the following steps S101 to S104.

Step S101: forming a display module, where the display module includes a plurality of pixel islands.

In a specific embodiment, the naked-eye 3D device is a liquid crystal display device, and forming the display module includes: forming an LCD module.

Figure 3:
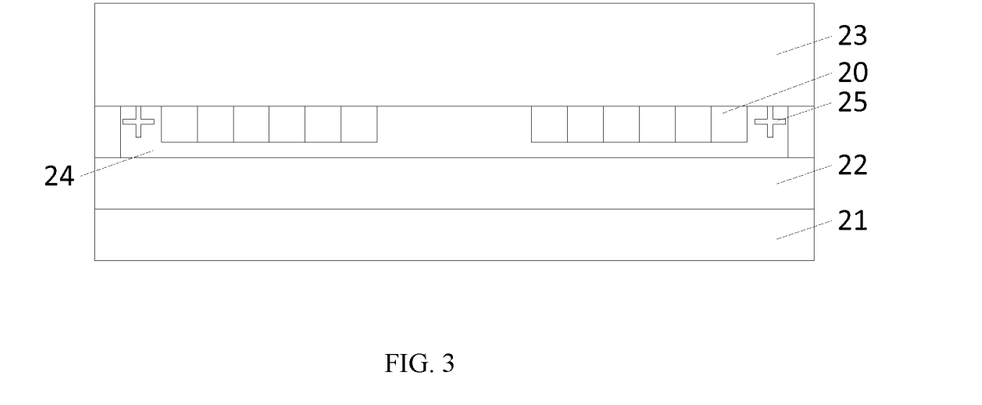
FIG. 3 to FIG. 8 show schematic cross-sectional views of structures corresponding to main steps of a manufacturing process of a naked-eye 3D device according to an embodiment of the present application.

As shown in FIG. 3, the LCD module includes a lower polarizer 21, an array substrate 22, a color filter substrate 23, and a liquid crystal layer 24 encapsulated between the array substrate 22 and the color filer substrate 23. The display module includes a plurality of pixel islands 20.

In one specific example, the display module further includes an alignment mark 25 (which may also be referred to as a first alignment mark) in an identical layer as the plurality of pixel islands 20. For example, four alignment marks 25 are distributed at four sides of the display module. The alignment mark 25 may be made of, for example, metal. The shape of the alignment mark 25 may be a cross, a circle, or a square.

In one specific example, the pixel island 20 includes a plurality of subpixels, for example, eight subpixels, arranged in an array. The colors displayed by sub-pixels in the same pixel island 20 may be the same, for example, one pixel island 20 includes a plurality of sub-pixels displaying green; or, the colors displayed by the sub-pixels within the same pixel island 20 may be different, for example, one pixel island 20 includes a sub-pixel displaying red, a sub-pixel displaying green, and a sub-pixel displaying blue.

Figure 4:
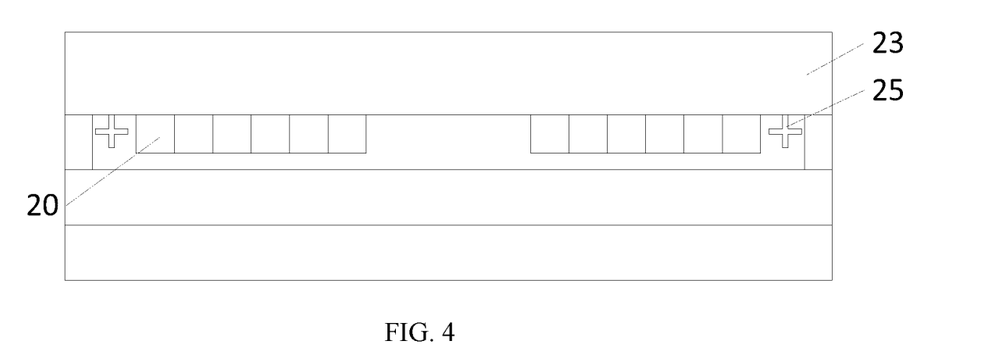
Figure 7:
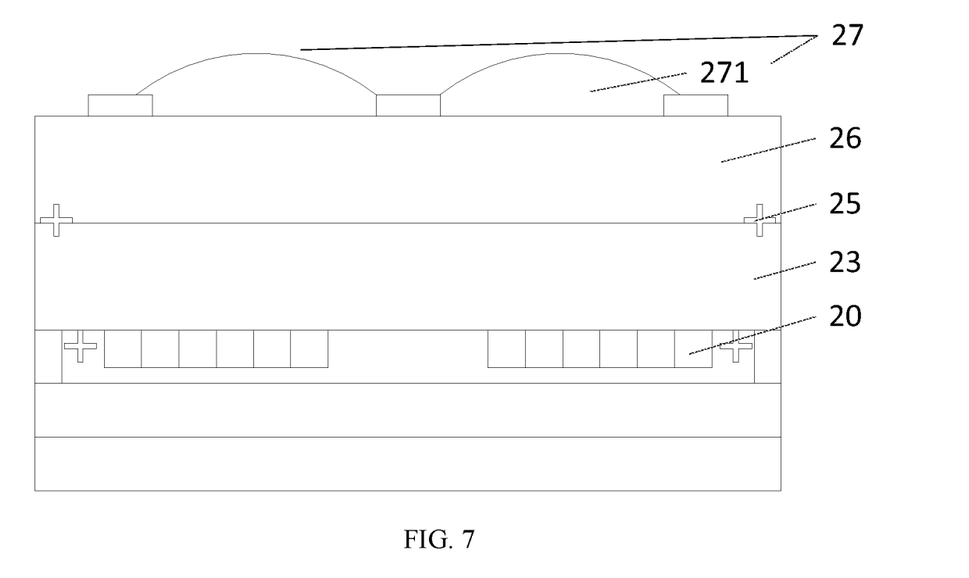

In one specific example where the naked-eye 3D device is a liquid crystal display device, as shown in FIG. 3, FIG. 4 and FIG. 7, the display module includes an alignment mark 25 (which may also be referred to as a first alignment mark) in the same layer as the plurality of pixel islands 20. In order to ensure that a photolithography apparatus can clearly identify the alignment mark 25 in the same layer as the pixel islands 20 when forming a micro-lens array 27, the color filter substrate 23 of the display module may be thinned first. For example, a thickness of the color filter substrate 23 in the structure shown in FIG. 4 is reduced relative to a thickness of the color filter substrate 23 in the structure shown in FIG. 3. In some embodiments, the thickness of the color filter substrate 23 may be thinned to a maximum thickness (which may also be referred to as a first thickness) at which the photolithography apparatus can achieve high-precision alignment, i.e., on the color filter substrate 23 of such thickness (i.e., the first thickness), the photolithography apparatus can clearly identify the alignment mark 25 in the same layer as the pixel islands 20 and can achieve accurate focus exposure. The maximum thickness at which high-precision alignment can be achieved varies for different photolithography apparatuses. In one specific example, when the maximum thickness at which the photolithography apparatus can achieve high-precision alignment is 0.2 mm, the thickness of the color filter substrate 23 can be reduced to 0.2 mm. In other words, the thickness of the color filter substrate 23 can be adjusted according to the size of the maximum thickness at which the photolithography apparatus can achieve high-precision alignment.

Step S102: forming an alignment mark (which may also be referred to as a second alignment mark) on the display module, where the alignment mark is used for, when forming a micro-lens array, aligning each micro-lens in the micro-lens array with one pixel island 20.

Figure 5:
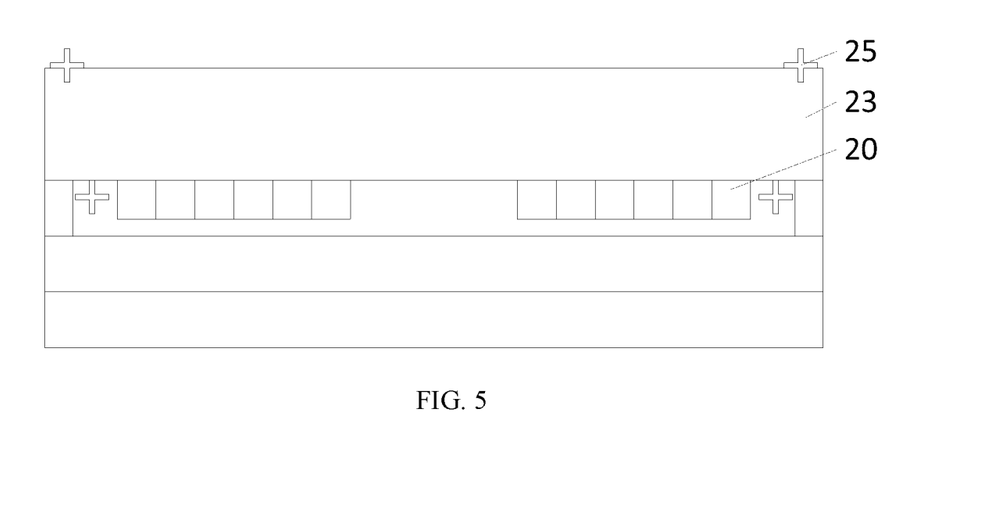

In one specific example where the naked-eye 3D device is a liquid crystal display device, the forming the alignment mark on the display module, includes: as shown in FIG. 5, forming a metal layer on the color filter substrate 23, and patterning the metal layer to form the alignment mark 25 (which may be also referred to as the second alignment mark).

In one specific embodiment, a metal layer is formed on the color filter substrate 23 according to the alignment mark 25 (the first alignment mark) in the same layer as the plurality of pixel islands 20, and then the metal layer is patterned to form a new alignment mark 25 (the second alignment mark). At this point, an adhesive layer such as an OCA optical adhesive with a high transmission rate, is coated on the color filter substrate 23. A thickness of the adhesive layer is the same as the thickness of the alignment mark 25 (the second alignment mark). The adhesive layer can be used for adhering the color filter substrate 23 and a spacer layer 26 in the subsequent process, while filling a gap between the color filter substrate 23 and the spacer layer 26, thereby preventing the color filter substrate 23 and the spacer layer 26 from being bent under pressure. The new alignment mark 25 (second alignment mark) is used as a reference when forming the micro-lens array 27, so that the photolithography apparatus directly takes the new alignment mark 25 (second alignment mark) formed between the spacer layer 26 and the color filter substrate 23 as a reference to perform exposing and molding of the micro-lens array 27.

Step S103: forming a spacer layer on the display module.

Figure 6:
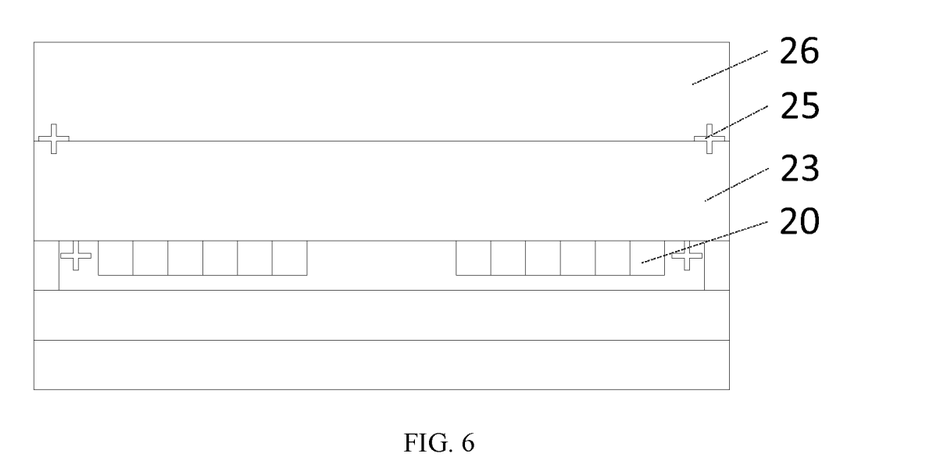

In one specific example where the naked-eye 3D device is a liquid crystal display device, as shown in FIG. 6, a spacer layer 26 is formed on the display module. The spacer layer 26 covers the second alignment mark 25. The second alignment mark 25 is located between the spacer layer 26 and the color filter substrate 23. The spacer layer 26 may be attached to the color filter substrate 23 by an adhesive layer such as an OCA optical adhesive with a high transmission rate.

In one embodiment, the spacer layer 26 is a transparent, electrically insulating film, such as a layer of glass, PET, or PMMA.

Step S104: forming a micro-lens array on the spacer layer, where the spacer layer is formed to have a thickness which enables the plurality of pixel islands to be located on a focal plane of the micro-lens array.

Specifically, as shown in FIG. 7, the micro-lens array 27 is formed on the spacer layer 26 by using a photolithography apparatus according to the alignment mark 25 (the second alignment mark) between the spacer layer 26 and the display module.

The focal plane of the micro-lens array 27 refers to a plane, where focal points of light rays refracted and emitted from the micro-lens array 27 are located, and which is perpendicular to an optical axis. In other words, enabling the plurality of pixel islands to be located on the focal plane of the micro-lens array means enabling a focal length of the micro-lens array 27 to be equal to a vertical distance between the micro-lens array 27 and the plurality of pixel islands 20.

By setting the spacer layer 26 to have a thickness which enables the plurality of pixel islands 20 to be located on the focal plane of the micro-lens array 27, crosstalk between a left-eye image seen by a user's left eye and a right-eye image seen by a right eye can be effectively reduced, thereby improving the 3D display effect of the naked-eye 3D device. Meanwhile, it also helps to determine a farthest viewing margin, a nearest viewing margin, a first sub-pixel for displaying the left-eye image and a second sub-pixel for displaying the right-eye image of the naked-eye 3D device, thereby effectively reducing complexity of a driving method of the naked-eye 3D device.

In one specific example, in order to enable the photolithography apparatus to clearly identify the alignment mark 25 (the second alignment mark) between the spacer layer 26 and the display module, the thickness (which may also be referred to as the second thickness) of the spacer layer 26 is smaller than a maximum height difference between the alignment mark 25 (the second alignment mark) where the photolithography apparatus can achieve high-precision alignment and a plane to form the micro-lens array 27, so that with the spacer layer 26 of such thickness (which may also be referred to as the second thickness), the photolithography apparatus can clearly identify the alignment mark 25 (the second alignment mark) between the spacer layer 26 and the display module, and perform accurate focus exposure.

In the manufacturing method in the related art, if a maximum height difference at which the photolithography apparatus can achieve high-precision alignment, is 0.2 mm, as shown in FIG. 1, in order to ensure high-precision alignment accuracy of the alignment mark 11 and the micro-lens array 12, a height distance between the alignment mark 11 and a plane to form the micro-lens array 12 can only be 0.2 mm, and then the pixel islands 13 cannot be located on a focal plane of the micro-lens array 12, and thus it is difficult to achieve multi-viewpoint naked-eye 3D display.

In one specific example where the naked-eye 3D device is a liquid crystal display device, as shown in FIG. 7, the focal length or placement height of the micro-lens array 27 is 0.4 mm, the maximum height difference at which the photolithography apparatus can achieve high-precision alignment is 0.2 mm, the thickness of the color filter substrate 23 is 0.2 mm, and the thickness of the spacer layer 26 is 0.2 mm. According to the manufacturing method, after forming the micro-lens array 27 on the spacer layer 26 according to the alignment mark 25 between the color filter substrate 23 and the spacer layer 26, a structure as shown in FIG. 7 is formed. This example can achieve that the plurality of pixel islands 20 are located on the focal plane of the micro-lens array 27 with the focal length or the placement height of 0.4 mm. Meanwhile, the thickness of the spacer layer 26 is within the maximum height difference (0.2 mm) at which the photolithography apparatus can achieve high-precision alignment; and then the photolithography apparatus can clearly identify the alignment mark 25 (the second alignment mark) under the spacer layer 26, thereby achieving that various micro-lens 271 in the micro-lens array 27 are corresponding to the pixel islands 20 in a one-to-one manner.

In one specific example, with regard to a conventional wafer-level photolithography apparatus, an alignment accuracy thereof is generally smaller than 0.2 μm, and the alignment accuracy using the manufacturing method can reach 0.4 μm, which is much higher than the attachment accuracy (generally greater than 3 μm) for attachment between a naked-eye 3D film and a display module in the related art.

In one specific example, the micro-lens 271 may be a cylindrical lens (which may be a concave lens or a convex lens). The size and shape of the micro-lenses 271 are consistent with the size and shape of the pixel islands 20, and may be a matrix, for example. The micro-lens array 27 is used to control directions of light rays. The pixel island 20 under the micro-lens 271 includes an array of sub-pixels. Among the array of sub-pixels included in the pixel island 20 under the micro-lens 271, some sub-pixels display a left-eye image, and the other sub-pixels display a right-eye image. Under refraction of the micro-lens 271, light rays are guided into a specific observation area, that is, after light rays emitted by the sub-pixels displaying the left eye image and light rays emitted by the sub-pixels displaying the right eye images pass through the micro-lens 271, propagation directions of the light rays are deflected, so that the light rays emitted by the sub-pixels displaying the left eye image enter the left eye of the user, and the light rays emitted by the sub-pixels displaying the right eye image enter the right eye of the user, thereby generating a pair of stereo images corresponding to the left and right eyes, and then generating stereo vision under the fusion of the brain. The naked-eye 3D device provided with the micro-lens array 27 does not block the display image and display brightness, and has a good stereoscopic display effect.

Figure 8:
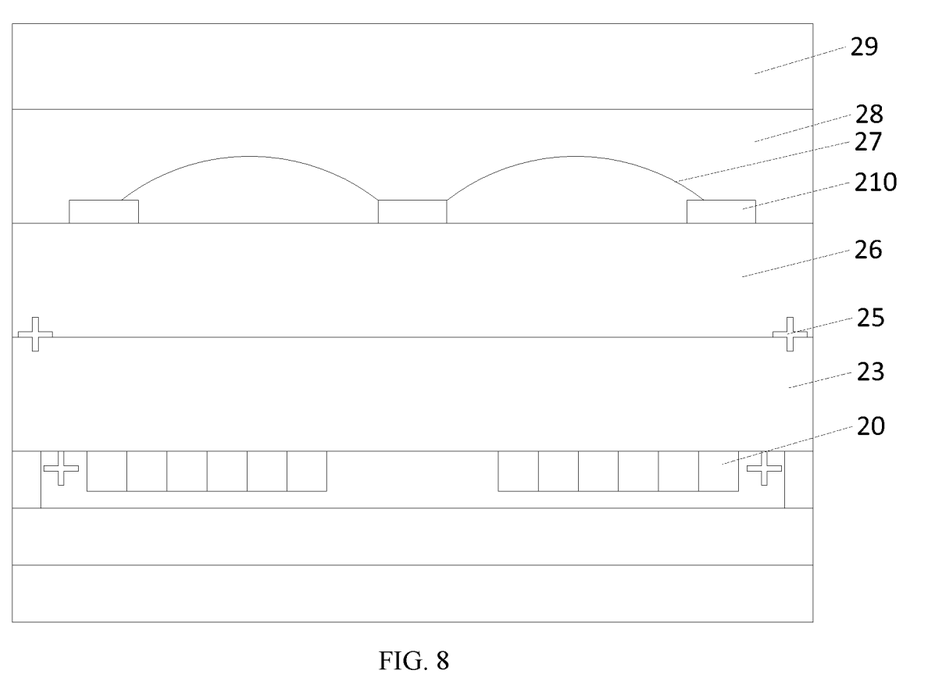

In one specific example where the naked-eye 3D device is a liquid crystal display device, the manufacturing method further includes: as shown in FIG. 8, forming a planarization layer 28 covering the micro-lens array 27, where the planarization layer 28 has a refractive index smaller than that of the micro-lenses 271; and, forming an upper polarizer 29 on the planarization layer 28.

The planarization layer 28 is used to flatten the micro-lens array 27. In this specific example, by using the planarization layer 28 with a low refractive index to cover the micro-lens array 27 with a high refractive index, it is possible to flatten the micro-lens array 27 while ensuring that directions of refracted light rays emitted the micro-lens array 27 are unchanged, thereby ensuring that the refracted light rays enter a preset observation region.

According to the method for manufacturing a naked-eye 3D device provided in this embodiment, with the alignment mark 25 (the second alignment mark) provided between the spacer layer 26 and the display module, when forming the micro-lens array 27, the photolithography apparatus can directly form the micro-lens array 27 according to the alignment mark 25 (the second alignment mark) between the spacer layer 26 and the display module without taking the alignment mark (the first alignment mark) in the display module as a reference, thereby reducing a distance between the alignment mark and the plane to form the micro-lens array 27. In this way, the photolithography apparatus can clearly identify the alignment mark 25 (the second alignment mark) between the spacer layer 26 and the display module and then perform accurate focus exposure, thereby effectively improving the alignment accuracy of the micro-lenses 271 and the pixel islands 20 to achieve high-precision alignment of the micro-lenses 271 and the pixel islands 20, and then achieving ultra-multi-viewpoint parallax 3D display of the fabricated naked-eye 3D device and improving the stereoscopic effect of the parallax 3D display of the naked-eye 3D device.

In one specific embodiment, the forming the spacer layer 26 on the display module, includes:

forming multiple layers of spacer layers 26; and forming an alignment mark 25 (second alignment mark) between every two layers of spacer layers 26; where the number of layers of spacer layers 26 is related to a focal length of the micro-lens array 27 to be formed.

Figure 9:
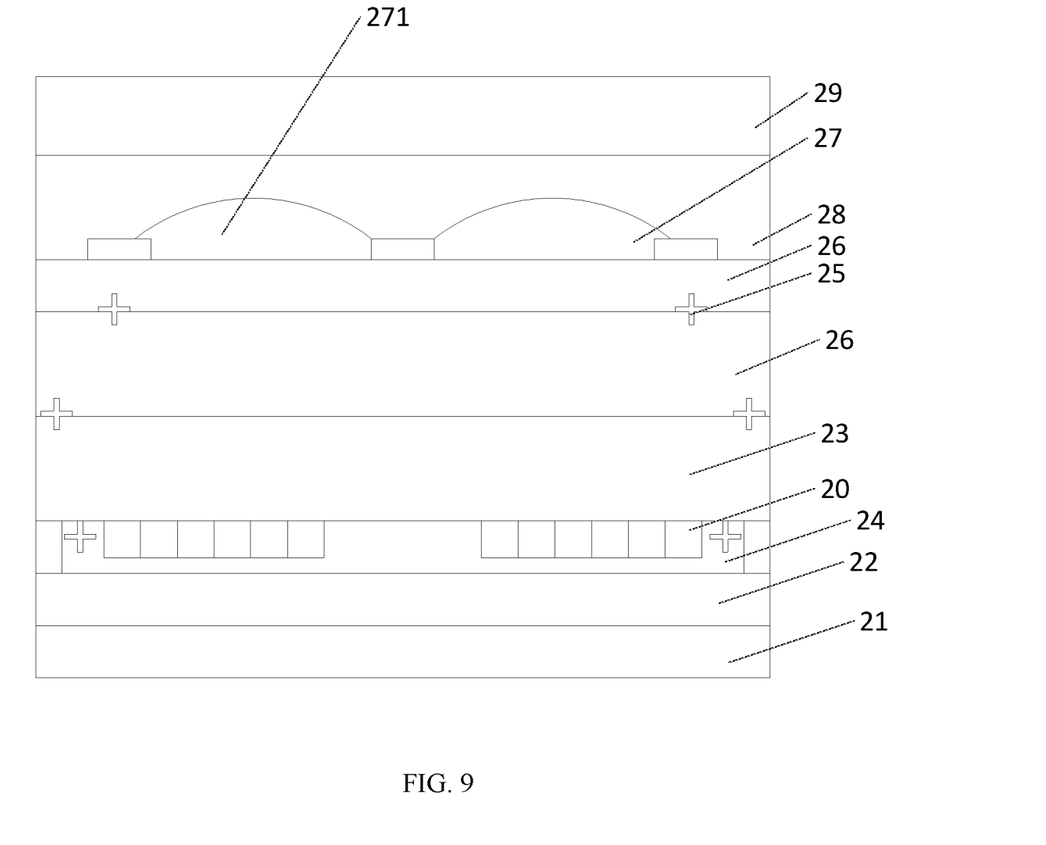
FIG. 9 shows a structural cross-sectional view of a naked-eye 3D device according to another embodiment of the present application.

In a naked-eye 3D liquid crystal display device with a greater requirement on a focal length or placement height of the micro-lens array 27, in order to ensure the high-precision alignment of the micro-lenses 271 and the pixel islands 20, multiple layers of spacer layers 26 and an alignment mark 25 (the second alignment mark) between every two layers of spacer layers 26 can be formed on the display module, and finally, the photolithography apparatus performs exposure molding of the micro-lens array 27 by taking an uppermost alignment mark 25 as a reference, thereby forming a structure as shown in FIG. 9. The thickness of the spacer layer 26 is smaller than the maximum height difference at which the photolithography apparatus can achieve high-precision alignment, that is to say, with the spacer layer 26 of such thickness, the photolithography apparatus can clearly identify the alignment mark 25 under the spacer layer 26 and perform accurate focus exposure.

In this embodiment, the focal length or placement height of the micro-lens array 27, the thickness of the spacer layer 26, the number of layers of spacer layers 26, and the alignment accuracy that can be achieved satisfy the following formulas:

$$N = \frac{H}{h};$$
$$A = N \times a;$$

where "H" is the focal length or placement height of the micro-lens array 27, "h" is the thickness of the spacer layer 26 (within this thickness range, the photolithography apparatus can achieve high-precision alignment accuracy), "N" is the number of layers of spacer layers 26 (including the color filter substrate), "a" is the alignment accuracy of the photolithography apparatus, and "A" is the overall alignment accuracy of the naked-eye 3D device. For the above formula, "N" is an integer, and if it is not an integer, it is rounded. In one example, if "N" is 3.1 or 3.9, then "N" is directly rounded as 4. The required number of layers of spacer layers 26 and thickness of the spacer layer 26 are determined by the focal length or placement height of micro-lens array 27 together with the maximum height difference at which the photolithography apparatus can achieve high precision alignment.

In one specific example, the focal length or placement height of the micro-lens array 27 is 0.8 mm, the maximum height difference at which the photolithography apparatus can achieve high-precision alignment is 0.2 mm, and the thickness of the color filter substrate 23 is 0.2 mm, then three layers of spacer layers 26 each having a thickness of 0.2 mm are added on the display module. For example, a first spacer layer, a second spacer layer and a third spacer layer are stacked in sequence on the display module. An alignment mark between the color filter substrate and the first spacer layer is formed according to the alignment mark in the display module. After the first spacer layer is formed, an alignment mark is formed on the first spacer layer according to the alignment mark between the color filter substrate and the first spacer layer. Then, the second spacer layer is formed on the first spacer layer, and then an alignment mark is formed on the second spacer layer according to the alignment mark between the first spacer layer and the second spacer layer. Then the third spacer layer is formed on the second spacer layer, and then the micro-lens array is formed according to the alignment mark between the second spacer layer and the third spacer layer. In this specific example, with regard to a conventional wafer-level photolithography apparatus, the alignment accuracy thereof is generally smaller than 0.2 µm, and the alignment accuracy using the manufacturing method can reach 0.8 μm, which is much higher than the attachment accuracy (generally greater than 3 μm) for attachment between a naked-eye 3D film and a display module in the related art.

In this embodiment, by forming the alignment marks 25 between the multiple layers of spacer layers 26, the naked-eye 3D device for different application scenarios can be made according to different focal lengths of different micro-lens arrays 27, thereby improving the degree of freedom of the manufacturing method and expanding the application range of the naked-eye 3D device manufactured according to this method. Meanwhile, by forming the alignment marks 25 between the multiple layers of spacer layers 26, the distance between the alignment mark 25 and the plane to form the micro-lens array 27 can be further reduced, so that the lithography apparatus can more clearly identify the alignment mark 25 and perform focus exposure, thereby achieving high-precision alignment of the micro-lenses 271 and the pixel islands 20.

In one specific embodiment, orthographic projections of the alignment marks 25 in different layers onto the display module do not coincide each other. By setting the alignment marks 25 of which the orthographic projections do not coincide each other, the photolithography apparatus can accurately identify the corresponding alignment mark 25 (e.g., the uppermost alignment mark, i.e., the alignment mark closest to the photolithography apparatus) when forming the micro-lens array 27, i.e., it is ensured that there is no other alignment mark in an identification area of the photolithography apparatus, so as to prevent an identification error of the photolithography apparatus.

In one specific embodiment, the forming the micro-lens array 27 on the spacer layer 26, includes: forming micro-lenses in contact with each other; or, forming micro-lenses that are not in contact with each other, and forming a black matrix 210 (as shown in FIG. 8) between the micro-lenses 271. The black matrix 210 between the micro-lenses 271 that are not in contact with each other, is used to prevent light leakage and ensure the display effect of the naked-eye 3D device.

One embodiment of the present application further provides a naked-eye 3D device. As shown in FIG. 9, the naked-eye 3D device includes:

a display module including a plurality of pixel islands 20;
a spacer layer 26 formed on the display module;
a micro-lens array 27 formed on the spacer layer 26, wherein the spacer layer 26 is formed to have a thickness such that the plurality of pixel islands 20 are located at a focal plane of the micro-lens array 27; and
an alignment mark 25 formed between the spacer layer 26 and the display module, where the alignment mark 25 is used for aligning each micro-lens 271 in the micro-lens array 27 with one pixel island 20 when forming the micro-lens array 27.

The display module is an LCD module. The display module includes a lower polarizer 21, an array substrate 22, a color filter substrate 23, and a liquid crystal layer 24 encapsulated between the array substrate 22 and the color filter substrate 23.

The naked-eye 3D device further includes a planarization layer 28 and an upper polarizer 29 formed on the planarization layer 28. The planarization layer 28 covers the micro-lens array 27. The planarization layer 28 has a refractive index smaller than that of the micro-lenses 271.

In one specific embodiment, there are multiple layers of spacer layers 26. The naked-eye 3D device further includes an alignment mark 25 formed between every two layers of spacer layers 26. The number of layers of spacer layers 26 is related to the focal length of the micro-lens array 27 to be formed.

Similarly, the manufacturing method of the foregoing embodiments can be used not only for naked-eye 3D liquid crystal display devices, but also for naked-eye 3D organic electroluminescent devices.

One embodiment of the present application further provides a method for manufacturing a naked-eye 3D device, including the following steps S201 to S204.

Step S201: forming a display module, where the display module includes a plurality of pixel islands.

In one specific example where the naked-eye 3D device is an organic electroluminescent device, the forming a display module, includes:

forming an OLED module or a micro-led display module, where the OLED module or the micro-led display module includes a TFT circuit layer, a light-emitting layer, and an encapsulation layer.

In one specific example, the light-emitting layer includes an anode layer, a light-emitting material layer and a cathode layer. The display module further includes an alignment mark in the same layer as the anode layer, for example, four alignment marks distributed at four sides of the display module. The alignment mark may be metal, for example. The shape of the alignment mark may be a cross, a circle or a square block. The alignment mark may be provided in the same layer as the anode layer, that is, the alignment mark and the anode layer may be formed by the same process, thereby simplifying the preparation process.

Step S202: forming an alignment mark on the display module, where the alignment mark is used for, when forming the micro-lens array, aligning each micro-lens in the micro-lens array with one pixel island.

In one specific example where the naked-eye 3D device is an organic electroluminescent device, the forming an alignment mark on the display module, includes:

forming a metal layer on an encapsulation layer of the display module;
and patterning the metal layer to form the alignment mark.

Step S203: forming a spacer layer on the display module.

Step S204: forming a micro-lens array on the spacer layer, where the spacer layer is formed to have a thickness such that the plurality of pixel islands are located at a focal plane of the micro-lens array. Specifically, the micro-lens array is formed on the spacer layer by using a photolithography apparatus according to the alignment mark between the spacer layer and the display module.

In one specific embodiment, the method further includes: after the micro-lens array is formed:

forming a planarization layer covering the micro-lens array, where the planarization layer has a refractive index smaller than that of the micro-lenses.

In this embodiment, by using the planarization layer with a low refractive index to cover the micro-lens array with a high refractive index, it is possible to flatten the micro-lens array while ensuring that directions of refracted light rays emitted the micro-lens array are unchanged, thereby ensuring that the refracted light rays enter a preset observation region.

One embodiment of the present application further provides a naked-eye 3D device, including:

a display module including a plurality of pixel islands;
a spacer layer formed on the display module;

a micro-lens array formed on the spacer layer, wherein the spacer layer is formed to have a thickness such that the plurality of pixel islands are located at a focal plane of the micro-lens array; and an alignment mark formed between the spacer layer and the display module, where the alignment mark is used for aligning each micro-lens in the micro-lens array with one pixel island when forming the micro-lens array.

The display module includes an OLED module or a micro-led display module. The OLED module or the micro-led display module includes a TFT circuit layer, a light-emitting layer, and an encapsulation layer.

The naked-eye 3D device further includes a planarization layer covering the micro-lens array. The planarization layer has a refractive index smaller than that of the micro-lenses.

In one specific embodiment, there are multiple layers of spacer layers. The naked-eye 3D device further includes an alignment mark formed between every two layers of spacer layers. The number of layers of spacer layers is related to the focal length of the micro-lens array to be formed.

The naked-eye 3D device may be any product or component with a display function, such as an electronic paper, a mobile phone, a tablet computer, a television, a display device, a notebook computer, a digital photo frame and a navigator.

The above descriptions are merely some embodiments of the present disclosure. It should be noted that for those of ordinary skill in the art, without departing from the principles of the present disclosure, various improvements and modifications can be made. These improvements and modifications should fall within the protection scope of the present disclosure.

What is claimed is:

1. A method for manufacturing a naked-eye 3D device, comprising:
   forming a display module including a plurality of pixel islands;
   forming a spacer layer on the display module; and
   forming a micro-lens array on the spacer layer, wherein the spacer layer is formed to have a thickness such that the plurality of pixel islands are located at a focal plane of the micro-lens array;
   wherein the method further includes:
   forming an alignment mark between the spacer layer and the display module, wherein the alignment mark is used for, when forming the micro-lens array, aligning each micro-lens in the micro-lens array with one of the plurality of pixel islands.

2. The method of claim 1, wherein the forming the spacer layer on the display module, includes: forming a plurality of spacer layers;
   the method further includes:
   forming an alignment mark between every two layers of spacer layers of the plurality of spacer layers, wherein the number of layers of spacer layers is related to a focal length of the micro-lens array to be formed.

3. The method of claim 2, wherein orthographic projections of alignment marks in different layers onto the display module do not coincide each other.

4. The method of claim 1, wherein the forming the micro-lens array on the spacer layer, includes:
   forming micro-lenses in contact with each other; or,
   forming micro-lenses that are not in contact with each other, and forming a black matrix between the micro-lenses.

5. The method of claim 1, wherein the forming the display module, includes:

forming an LCD module, wherein the LCD module includes a lower polarizer, an array substrate, a color filter substrate, and a liquid crystal layer encapsulated between the array substrate and the color filter substrate.

6. The method of claim 5, wherein the forming the alignment mark between the spacer layer and the display module, includes:
   forming a metal layer on the color filter substrate; and
   patterning the metal layer to form the alignment mark.

7. The method of claim 5, further comprising:
   forming a planarization layer covering the micro-lens array, wherein the planarization layer has a refractive index smaller than a refractive index of the micro-lens; and
   forming an upper polarizer on the planarization layer.

8. The method of claim 1, wherein the forming the display module, includes:
   forming an OLED module or a micro-led display module, wherein the OLED module or the micro-led display module includes a TFT circuit layer, a light-emitting layer, and an encapsulation layer.

9. The method of claim 8, wherein the forming the alignment mark between the spacer layer and the display module, includes:
   forming a metal layer on the encapsulation layer; and
   patterning the metal layer to form the alignment mark.

10. The method of claim 8, further comprising:
    forming a planarization layer covering the micro-lens array, wherein the planarization layer has a refractive index smaller than a refractive index of the micro-lens.

11. The method of claim 1, wherein the forming the micro-lens array on the spacer layer, includes:
    forming the micro-lens array on the spacer layer by using a photolithography apparatus according to the alignment mark between the spacer layer and the display module.

12. A naked-eye 3D device, comprising:
    a display module including a plurality of pixel islands;
    a spacer layer on the display module; and
    a micro-lens array on the spacer layer, wherein the spacer layer has such a thickness that the plurality of pixel islands are located at a focal plane of the micro-lens array;
    wherein the device further includes:
    an alignment mark between the spacer layer and the display module, wherein the alignment mark is used for aligning each micro-lens in the micro-lens array with one pixel island when forming the micro-lens array.

13. The device of claim 12, wherein there is a plurality layers of spacer layers, and
    the device further includes an alignment mark between every two layers of spacer layers of the plurality of spacer layers, wherein the number of layers of spacer layers is related to a focal length of the micro-lens array.

14. The device of claim 13, wherein orthographic projections of alignment marks in different layers onto the display module do not coincide with each other.

15. The device of claim 12, wherein the display module is an LCD module; the display module includes a lower polarizer, an array substrate, a color filter substrate, and a liquid crystal layer encapsulated between the array substrate and the color filter substrate.

16. The device of claim 15, wherein the device further includes a planarization layer covering the micro-lens array;

and the planarization layer has a refractive index smaller than a refractive index of the micro-lens.

17. The device of claim 16, wherein the device further includes an upper polarizer on the planarization layer.

18. The device of claim 12, wherein the display module is an OLED module or a micro-led display module; the OLED module or the micro-led display module includes a TFT circuit layer, a light-emitting layer, and an encapsulation layer; and the device further includes a planarization layer covering the micro-lens array, wherein the planarization layer has a refractive index smaller than a refractive index of the micro-lens.

19. The device of claim 12, wherein the micro-lens array includes:

micro-lenses in contact with each other.

20. The device of claim 12, wherein the micro-lens array includes:

micro-lenses that are not in contact with each other, and a black matrix between the micro-lenses.

\* \* \* \* \*